May 1, 1951  P. J. CAMPBELL  2,551,526
MULTIPLE PRESSURE RECORDER
Filed Jan. 22, 1944  2 Sheets-Sheet 1

INVENTOR
Paul J. Campbell
BY Charles L. Shelton
ATTORNEY.

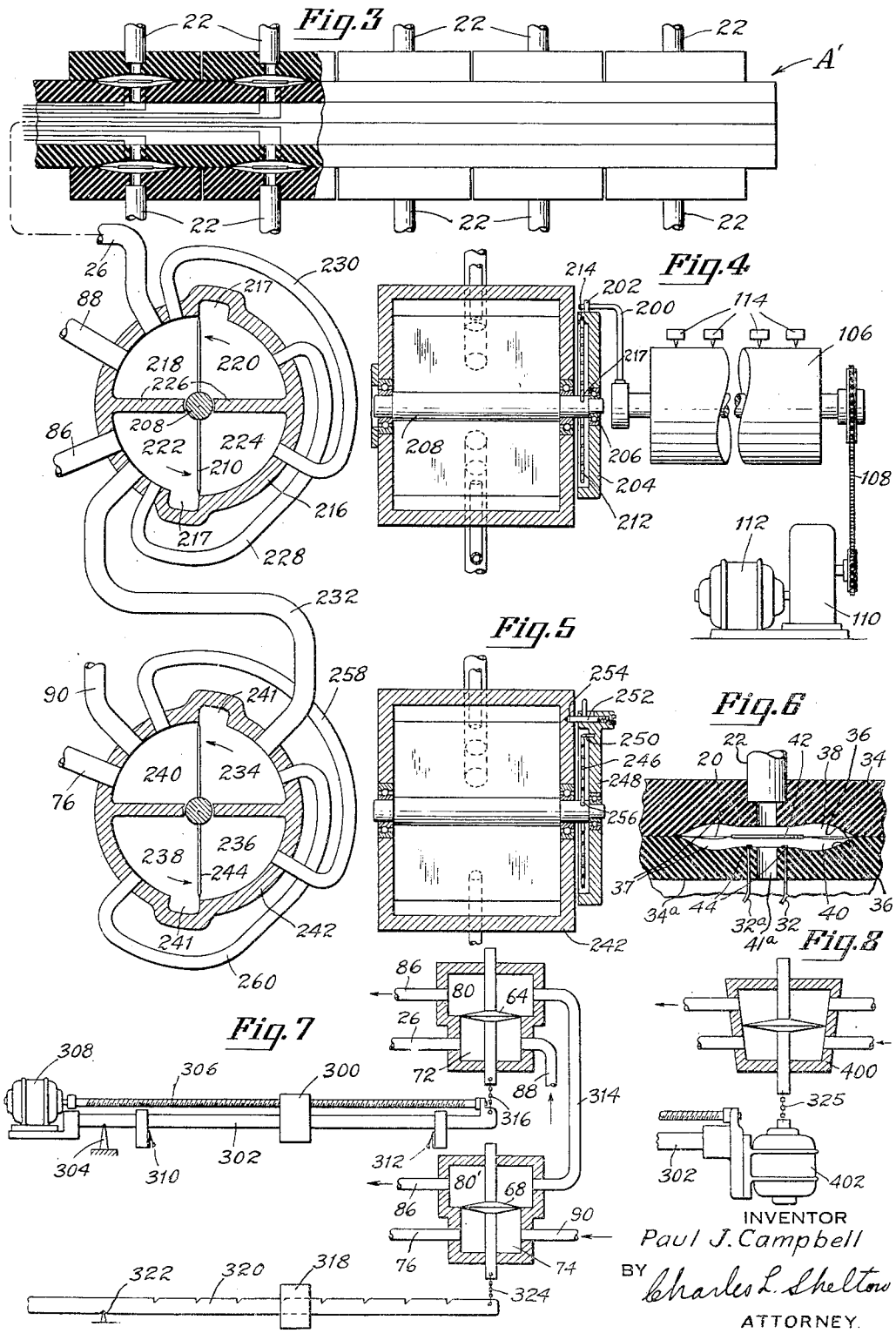

Patented May 1, 1951

2,551,526

UNITED STATES PATENT OFFICE 2,551,526

MULTIPLE PRESSURE RECORDER

Paul J. Campbell, Manchester, Conn., assignor to United Aircraft Corporation, East Hartford, Conn., a corporation of Delaware Application January 22, 1944, Serial No. 519,292

9 Claims. (Cl. 73—147)

This invention relates to an apparatus for measuring and recording multiple fluid pressures simultaneously, and which is particularly adapted for recording the momentary values of a large number of temporarily fixed pressures such as occur in the full scale flight or wind tunnel testing of aircraft or aero engine installations.

An object of this invention is to provide a new and improved instrument for accurately and quickly measuring and recording a large number of different positive or negative fluid pressures and for indicating the relationship between such pressures.

Other objects and advantages will be apparent from the specification and claims, and from the accompanying drawings which illustrate what are now considered to be preferred embodiments of the invention.

In the drawings,

Fig. 3 is a diagrammatic view of a modification of the flight testing instrument of Fig. 2.

Fig. 4 is a side view, partly in section, of a portion of the apparatus of Fig. 3.

Fig. 5 is a cross-section of another portion of the apparatus of Fig. 3.

Fig. 6 is an enlarged view of a portion of a modified cell unit.

Fig. 7 is a diagrammatic view of a modification of the balancing pressure regulating apparatus.

Fig. 8 is a diagrammatic view showing a further modification of the balancing pressure regulator, together with means for reducing friction between the pressure regulating piston and its cylinder.

Although many excellent pressure recording instruments have been developed, they are generally unsuitable for wind tunnel or flight testing of aircraft power plants because they have been designed to record the time variation of one or two pressures rather than the momentary values of a large number of temporarily fixed pressures. One method which has been used to advantage in wind tunnel work has been to photograph manometers. This method, however, has the disadvantage that the record is not available for some time after it has been taken and the manometers are troublesome to connect. None of the available instruments or methods of recording pressure are completely satisfactory.

In addition to the rapid and reliable recording of a number of pressures, which may exceed a hundred on an average test, a wind tunnel or flight instrument must conform to many requirements peculiar to aircraft work. In tunnel testing of engine installations, connections between the nacelle and the control room must be compact and easy to install. The size of passage necessary to carry leads and controls to the engine will determine the minimum thickness of fairing between the engine nacelle and the tunnel wall, and compact leads are, therefore, necessary to reduce fairing interference. To reduce the time of installing the test nacelle to a minimum, it is desirable to complete as much of the installation as possible while the nacelle is in the shop and simply plug in to standardized panels after it has been placed in the tunnel. If pressure-sensitive pickups are to be placed within the nacelle they must be insensitive to the vibration and temperature variations encountered near an engine. The record must be available to the operator immediately after it has been made, without the necessity of any development or fixing, and it must be permanent. The recorded pressures must be easy to identify. These and additional requirements are also present in the flight testing of aircraft.

Figure 1:
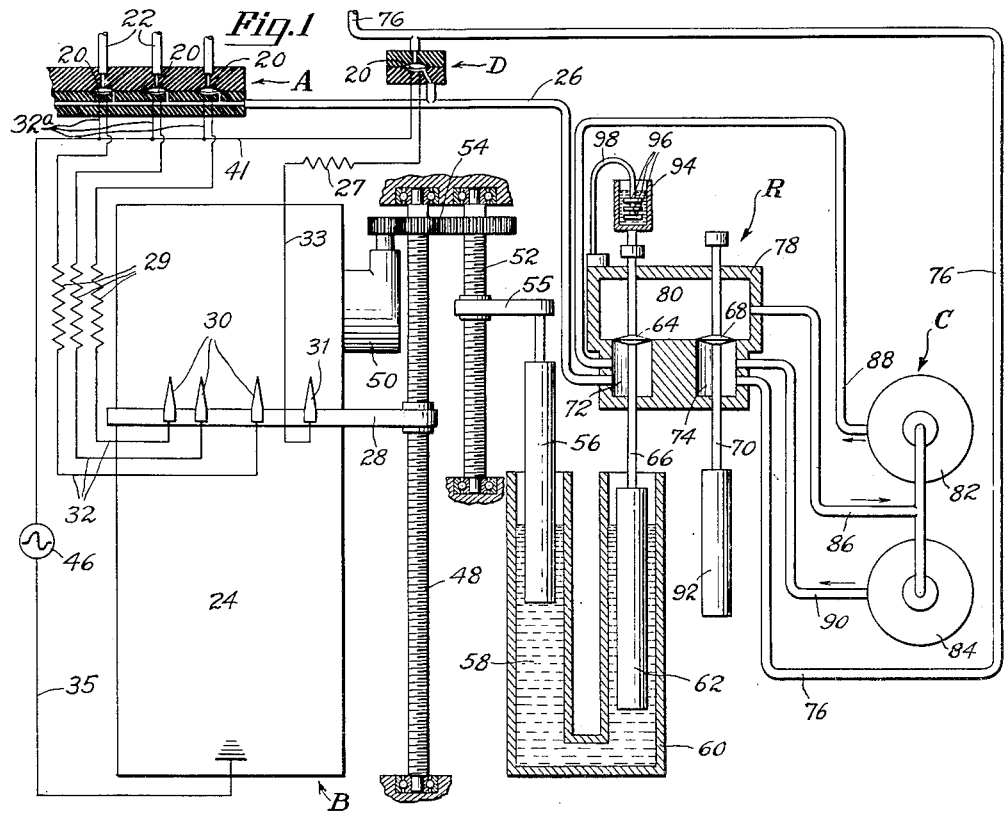
Fig. 1 is a diagrammatic view of a multiple pressure recording manometer particularly adapted for wind tunnel testing.

According to this invention, an instrument may be constructed which meets these requirements. Referring to the drawings, Fig. 1 shows a cell unit A having a number of limp diaphragms 20 to each of which is applied one of the pressures to be recorded through tubes 22; compressors C and regulator R for controlling a varying balancing pressure applied to the back of the diaphragm 20; and a recording system B to indicate on chart 24 the balancing pressure necessary to balance each diaphragm against the pressure in the corresponding tube 22.

Pressure regulator R automatically controls the pressure created by compressors C to provide a gradually varying balancing pressure, which is applied simultaneously through tube 26 to the back of all the diaphragms 20. As recording arm 28 moves, this balancing pressure in tube 26 is gradually varied in such a way that it is always precisely in proportion to the displacement of the recording arm 28. Arm 28 carries one stylus 30 for each pressure to be recorded. The mark made by each stylus on electrically sensitive paper 24 is controlled by an electrical circuit through the corresponding diaphragm. As the balancing pressure is gradually increased, it exceeds, one by one, the respective pressures in tubes 22 on the opposite side of the diaphragms; and as it does so, the respective diaphragm is displaced and the electrical circuit through the coeresponding stylus is broken. Since each stylus is arranged to record only while its electrical circuit is closed, it marks on the chart a line whose length is proportional to the pressure measured by the diaphragm.

The only connections between the diaphragm cell unit A and the recorder B consist of tube 26 to transmit the balancing pressure and a multi-wire cable including stylus leads 32 and ground lead 35 to carry electrical current from the diaphragms through the recording points 30. The diaphragms may be mounted in the model being tested and connected by small rubber tubes 22 to the various points P where pressure is to be measured (see Fig. 2). As used herein, the term "model" is intended to mean any structure or member being tested, whether full or part scale or a mock-up or a complete operative machine, in flight or otherwise.

Cell unit A is shown as containing three diaphragms, although more will ordinarily be used. Fig. 6 shows a cross-section through a single diaphragm, which may be made of a small disc of colon leather. This material is extremely thin and limp, yet adequately tough, airtight, and durable. The leather discs are clamped between plates 34, 34a which may be made of Lucite. Shallow concave recesses 38, 40 machined in each plate at the locations of the diaphragms permit the diaphragms to deflect a short distance in either direction. As shown in the modification of Fig. 6, these recesses may be formed with relieved wall portions 36; or they may be made partispherical as in Fig. 1. The space formed by recess 38 and one side of the diaphragm is connected to the pressure to be measured by tube 22; on the other side, the space formed by recess 40 communicates through hole 41a with the common passage 26 leading to the pressure regulator R. The diaphragms are each limp, or untensioned, and an extremely small pressure difference is sufficient to deflect a diaphragm from one wall to the other. As the diaphrgam deflects, it opens or closes a circuit through a thin silver 42, cemented to the center of the diaphragm. Two silver contact points 44 imbedded in the Lucite wall on the balancing-pressure side of the diaphragm including recess 40 complete the circuit through leads 32, 32a and conductor 41 connecting the styluses 30 on the recording arm to an electrical source of power 46 (Fig. 1). Thus, when the balancing pressure in the chamber formed by recess 40 is less than measured pressure in the chamber formed by recess 38, the diaphragm will be urged by the pressure difference toward the wall of recess 40 and the silver disc 42 will contact points 44 to close the circuit through the corresponding stylus 30 and paper 24. Similarly, this circuit will be broken whenever the balancing pressure in the chamber formed by recess 40 slightly exceeds the pressure in the chamber formed by recess 38.

The function of the pressure regulator R is to maintain an exact proportionality between the position of the recording points 30 relative to paper 24, and the balancing pressure. In some prior pressure recording or indicating instruments, a stylus or pointer is moved by the force due to the pressure applied, but according to this invention this process is reversed; the position of the stylus at all times determines the balancing pressure, which is utilized to indicate the value of the measured pressure. As the recording arm 28 is driven by a motor across the chart, the balancing pressure in tube 26 is caused to vary accordingly, in a manner explained below, thus completely eliminating any error due to friction of the numerous styluses.

Chart 24 is an electrically sensitive paper which is fixed for any one reading and the recording arm is moved across the chart by an accurately-machined lead screw 48, driven by a small electric motor 50. Another lead screw 52, geared to the first by gear train 54, slowly moves a threaded member 55 and an attached iron bar 56 relative to a column of mercury 58 in U-tube 60, and causes the mercury level to vary in both legs of the U-tube in proportion to the displacement of the recording arm. This change in mercury level causes a proportional variation in the buoyant force on an iron bar or weight 62, suspended at a substantially fixed height as explained below, and partly submerged in the mercury.

Weight 62 is connected by rod 66 to a conical floating piston 64, which controls the pressure of the balancing fluid in tube 26. The weight 62 exerts a downward force on piston 64, which force is varied as the effective weight of the bar is altered by changes in the level of the mercury in the U-tube 60.

Piston 64, and a second conical piston 68, are respectively mounted on slender rods 66, 70 in cylinders 72, 74, which are connected respectively to the balancing side of the diaphragms by tube 26 and to tunnel static pressure by tube 76. The term "tunnel pressure" as used herein refers to the static pressure in the fluid or atmosphere immediately surrounding the model, either in a wind tunnel or in flight; or in other words, the zero or reference pressure to which the measured pressures are compared.

The cylinders are machined side by side in a common block 78, and both open into a large space 80 at the top of the block. To reduce friction, the pistons are provided with enough clearance to prevent their touching the cylinder walls. The space 80 above the cylinders is connected to the intake or suction side of two small motor-driven compressors 82, 84, which are preferably of the rotary vane type, by conduit 86. The outlet or higher pressure sides of compressors 82, 84 are connected to cylinders 72, 74, respectively.

The compressors pump air from the space above the pistons into the cylinders 72, 74 below them, thus lifting the pistons to the tops of their cylinders, where they come to rest because of the sudden increase in air leakage past the pistons at these points. The unit pressure difference across each piston will, therefore, be maintained at a value equal to the effective weight of the piston divided by its area. Any change in the weight or downward force on either piston will immediately cause a proportional change in the pressure difference across the piston.

The two pistons serve different purposes. Piston 68 is restrained by a constant weight 92 and, therefore, serves only to maintain a constant negative pressure (relative to tunnel pressure) in the space 80 above piston 64. The reason for maintaining a negative pressure in this space is to permit the balancing pressure in tube 26 to extend to negative values, for measuring pressures which are less than tunnel static pressure. Unlike piston 68, which is biased by a constant force, piston 64 is restrained by a weight 62 which is immersed to varying degrees in mercury. When the mercury level is varied, the effective weight or force on the piston changes, and the pressure differential across the piston 64 will alter accordingly. Since the pressure in space 80 is maintained constant, relative to tunnel pressure, by piston 68, any change in the pressure differential across piston 64 effects a corresponding change in balancing pressure in tube 26. Because the level of the mercury in U-tube 60 is varied in proportion to the movement of arm 28 and bar 56 geared thereto, the effective weight or force exerted by bar 62 on piston 64, and consequently the value of the balacing pressure in tube 26, will be proportional to the amount of movement or displacement of the styluses relative to chart 24.

While some air circulates through the compressors and the cylinders, no air enters or leaves the system except for the slight flow caused by leakage and variations in the density of the air within the system. Although cylinder 74 is open to tunnel static pressure, there is little or no flow through tube 76.

Either or both pistons may be damped to prevent self-excited vibrations, by an oil-filled dash pot 94 mounted on either or both piston rods, and including spaced plate members 96 supported in the oil in the dash pot by a standard 98, in such a way that mechanical contact between the moving parts is impossible. This dash pot introduces no restraining force on the piston except when there is motion, and it will practically eliminate piston vibration.

Chart 24 is electrically conductive paper such as Teledeltos paper, which turns black at any point where an electric current is carried to its surface. Standard 110 volt alternating current from a generator 46 or a wall receptacle may be used for the recording. A 4,000-ohm resistance 29 in the circuit through each stylus and diaphragm prevents excessive current flow, which might cause burning of the paper or arcing at the diaphragm contact points. The current is brought from power source 46 to the styluses on the recording arm through conductor 41, leads 32a, diaphragm disc 42 and leads 32. A ground wire 35 connects power source 46 to a metal platen at the back of the paper and completes a circuit. The styluses may be simply small cantilever springs with rounded contact points bearing lightly against the paper.

Since the datum for all measurements is tunnel pressure (or an equivalent reference pressure such as atmospheric pressure), it is necessary to record this pressure on the chart as a zero or reference from which to measure the other pressures. To register this point, a single diaphragm unit D having a diaphragm 20 is connected across the cylinders 72 and 74 of the pressure regulator. The current from this diaphragm is carried to one or more styluses such as shown at 31, at one or both sides of the chart, by a lead or leads 33. When balancing pressure becomes equal to tunnel pressure, the line or lines drawn by these reference styluses are terminated; a horizontal line may later be drawn with pencil through the termination points of these lines to form a zero line. Recording the instrument zero automatically in this manner on each record is a distinct advantage in that it eliminates error due to variations in the zero or to improper location of the chart.

In operation, the recording paper 24 is fixed on a stationary electrically conducting platen (like that shown at 104 in Fig. 2) to which ground lead 35 is connected. To make a record, the operator closes a switch (not shown) which controls the lead screw drive motor 50. Compressors 82, 84 are preferably powered by a separate motor or motors, not shown. After the recording arm 28 has traveled the length of the chart, the current to the styluses is automatically turned off by limit switches and the motor reversed in a well known manner. As such limit switches and reversing mechanism are conventional per se, they have not been shown. After the arm has returned to its original position, the chart may then be pulled off the platen and replaced by fresh paper, for another recording.

When the compressors 82, 84 are in operation, the pressure in chamber 80 will be maintained at a value which is less than the pressure in cylinder 74 by an amount proportional to the weight of bar 92. Cylinder 74 is directly connected by tube 76 to the tunnel pressure and therefor the pressure in cylinder 74 will also be at tunnel pressure. Compressor 84, which pumps air out of chamber 80, will reduce the pressure therein until it is just sufficient to maintain weight 92 in the raised position shown. In other words, the pressure drop across piston 68 will be maintained at exactly that value necessary to support weight 92, and is determined by the value of this weight. Because cylinder 74 is open to the tunnel and is, therefore, at tunnel pressure, the pressure in chamber 80 will be maintained by compressor 84 at a substantially constant negative value, with respect to reference or tunnel pressure. Therefore, piston 64 is always exposed to a back pressure in chamber 80 which is at a fixed value relative to tunnel pressure and which is less than tunnel pressure by an amount which may be adjusted by varying weight 92.

As recording arm 28 is driven along the paper by motor 50 and lead screw 48, the bar 56 will be moved relative to the mercury 58 by gear train 54 and screw 52 in exact proportion to the movement of the recording arm. The change in level of mercury 58 in U-tube 60 will, therefore, also be exactly proportional to the displacement of the recording arm and the change in effective weight of bar 62, or the buoyant force exerted by the mercury on this weight, will be exactly proportional to the movement of the recording arm. Thus, the force exerted on piston 64 will be varied as the styluses travel over the paper and the value of this force will always be proportional to the amount of movement of the recording points.

Because the pressure drop between chamber 80 and cylinder 72 is determined by the effective weight of bar 62, this pressure drop will also vary as the arm 28 moves, in exact proportion to the displacement of the arm. As the pressure in chamber 80 is fixed at a negative value with respect to tunnel pressure by piston 68, the balancing pressure which is maintained in cylinder 72 by compressor 82 and the action of piston 64 will be varied from a negative to a positive value with respect to tunnel pressure and yet will always be exactly proportional to the total displacement of the recording arm. Consequently the length of the lines marked by the points 30 on the paper 24 will be an exact measure of the value of the balancing pressure in tube 26, the balancing pressure becoming higher as the lines grow longer. As the line is marked on the paper only when current is flowing through a respective stylus, the value of the measured pressure in any one of the tubes 22 will be indicated by the length of the corresponding line, because the line will terminate when the circuit through the respective diaphragm is interrupted, which will occur when the balancing pressure equals or very slightly exceeds the measured pressure in a respective tube 22. The relative length of the lines directly indicates the relative values of the measured pressures in the respective tubes 22 and the absolute value of any one of these measured pressures may be determined by measuring the length of the line scribed by the corresponding stylus above a reference or zero pressure line, the instrument, of course, being calibrated so that the units of length of the lines may be converted into units of pressure.

The scale and range of the instrument may be made almost any desired values within the limits of the compressors and diaphragms used. In the form shown, the range may be from about −26 to +36 inches of water, and the scale may be one inch to four inches of water. The range may be changed by changing the quantity of mercury in the U-tube. Changes in the scale may also be made either by changing gears on the lead screws or by changing the diameter of either of the bars immersed in the mercury. The instrument may be constructed to make a complete record in considerably less than one minute, and with an accuracy better than 0.1% of full scale.

If the measured pressure is fluctuating, the recorded line instead of terminating at a definite point, will end in a series of dashes, which become shorter until they disappear. The lowest break in the line represents the minimum of the fluctuation and the highest dot, the maximum. Thus, the instrument will give a fair idea of the magnitude and frequency of the fluctuation and permit a reasonable estimate to be made of the mean.

An instrument may be constructed according to this invention to record relatively low air pressures encountered in airfoil testing, or it may be modified to record some of the higher pressures encountered in engine testing. For intermediate pressures, smaller pistons may be used in the pressure regulator R. For still higher pressures, such as those in engine lubricating oil systems and torque measuring devices, the pneumatic system shown may be replaced with a hydraulic or liquid system.

With some modifications in construction and arrangement, these same principles as disclosed in connection with Fig. 1, may be utilized to construct an instrument particularly adapted for flight testing, or for the recording of pressures encountered during aircraft maneuvers at various flight altitudes.

Figure 2:
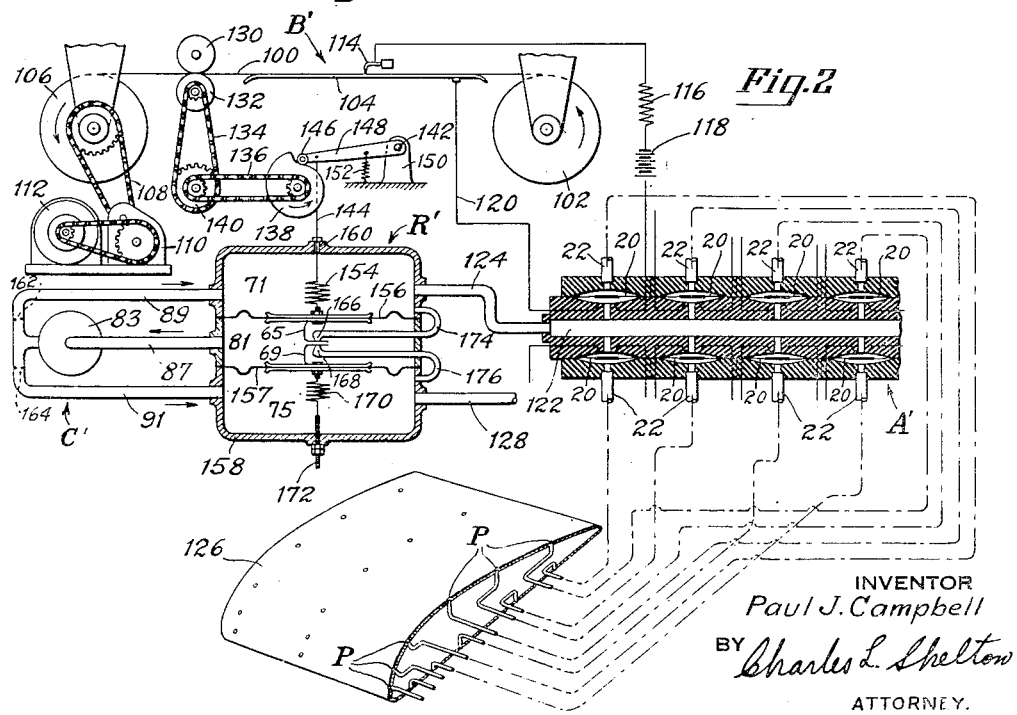
Fig. 2 is a diagrammatic view of a multiple pressure recording manometer particularly adapted for aircraft flight testing.

Fig. 2 shows one such modification, particularly adapted for flight testing. In this figure paper 100 passes from roll 102 over the metal platen 104 and is wound on roll 106 driven by motor 112 through chain 108 and a reduction gear unit 110. A stylus 114 (more than one is usually provided) is connected through resistance 116 to a source of current 118. The circuit is completed through a disc 42 (Fig. 6) of a diaphragm 20 in a cell unit A', which is similar in construction to that shown in Figs. 1 and 6. A ground lead 120 connects platen 104 with one of the contacts 44 (Fig. 6) of each diaphragm cell, in a manner similar to the ground connection 35 in Fig. 1.

Cell unit A' may be constructed as a two-tier device having opposed cell blocks each subjected to a balancing pressure in a common chamber 122, which is supplied by a pressure regulator R', through tube 124. The measured pressure sides of each diaphragm in the cell unit are connected by individual tubes 22 to the various points P at which the pressure is to be measured, in this instance points spaced along the surface of an airfoil 126.

The regulator R' of Fig. 2 acts in a manner similar to the regulator R of Fig. 1 to maintain a balancing pressure in chamber 122 which is always exactly proportional to the displacement of paper 100 past stylus 114. However, regulator R' is controlled by a variable tension spring. As the paper 100 is pulled over the platen the friction rolls 130, 132, which are maintained by some conventional mechanism in frictional contact with the paper, are rotated and drive cam 138 by chains 134, 136 and sprocket wheel 140. If desired, roll 132 may be provided with teeth engaging perforations in the margin of paper 100 to provide a positive drive. This per se is conventional and has therefore not been shown.

Bearing on cam 138 is a roller 146 on the end of an arm 148 pivoted at 142 to a support 150. A spring 152 acting between arm 148 and support 150 maintains the roller in engagement with the cam.

As the paper moves past the stylus 114, cam 138 is rotated in exact proportion to the displacement of the paper relative to the stylus and arm 148 will be raised, by rotation of the cam, and in accordance with its contour, to vary tension of spring 154, which biases a diaphragm 156 in the regulator chamber 158 in an upward direction. A thin rod or wire 144 connects arm 148 and spring 154. A seal may be provided at 160, where rod 144 passes through chamber 158, or a slight clearance may be provided at this point.

Diaphragm 156 is subjected to a pressure differential created in air or other fluid pumped from compressor 83 through conduit 89 to chamber 71, and from chamber 71 through conduit 174 and a valve 65, 166 to chamber 81. The fluid is returned from chamber 81 to compressor 83 by a conduit 87. Tension spring 154 biases diaphragm 156 in an upward or valve closing direction and the pressure in chamber 71 will therefore build up to that value which is just sufficient to force diaphragm 156 downwardly against the bias of spring 154 and open valve 65, 166. This valve may be formed simply as a U-shaped sheet metal member 65 attached to diaphragm 156 and cooperating with the tapered open end 166 of conduit 174 to control the flow through the conduit. Thus the amount by which the pressure in chamber 71 exceeds the pressure in chamber 81 is determined by the force exerted on the diaphragm by spring 154, and may be varied by varying the tension of this spring.

The tension of spring 154 is controlled by cam 138 so as to always be proportional to the displacement of paper 100, the cam being rotated as the paper moves to lift arm 148 and increase the tension on spring 154. Therefore, the pressure in chamber 71 will be varied in exact proportion to the movement of paper 100 past stylus 114; and this balancing pressure is applied by conduit 124 to chamber 122 in the cell unit A', in a manner similar to that described in connection with Fig. 1.

In order to permit measurement of pressures less than the tunnel pressure (or the datum pressure of the fluid or atmosphere surrounding airfoil 126) the chamber 81 of regulator R' is maintained at a constant negative value, or back pressure, with respect to the datum pressure. This is accomplished by a second diaphragm regulator 157 provided with a valve member 69 cooperating with the tapered open end 168 of a conduit 176 connecting the middle, or back pressure, chamber 81 with a datum pressure chamber 75. Chamber 75 is connected with the output side of compressor 83 by a conduit 91 and is also open through conduit 128 to the datum pressure of the fluid flowing over model 126. An adjustable spring 170 biases diaphragm 157 in a direction tending to close nozzle 168 by valve member 69 and therefore the pressure in chamber 81 will be reduced by the compressor until the pressure difference between chambers 75 and 81 is just sufficient to overcome the bias of spring 170. Because the pressure in chamber 75 is always equal to the datum pressure at the open end of conduit 128, it will be seen that the pressure in chamber 81 will always be proportional to but less than this datum pressure. Thus, measurement of pressures which are less than the datum pressure, such as would occur at points P along the top of airfoil 126, may be made.

One or more zero indicating cells and styluses may also be used in connection with the modification of Fig. 2, as shown at D and 31 in Fig. 1.

Where a single compressor is used as shown in Fig. 2, restrictions 162, 164 may be provided if desired, in order to avoid interference between the two output lines of the common compressor.

Another modification particularly suitable for flight testing is shown in Figs. 3, 4 and 5. Here the cell unit A' is like that shown in Fig. 2 but the balancing pressure regulator is a rotary vane type; the compressor unit may be either that of Fig. 1 or that of Fig. 2.

An electrically sensitive paper is driven past styluses 114 (Fig. 4) by motor 112 driving chart drum 106 through a gear reduction unit 110 and a chain drive 108. Drum 106 carries arm 200 which engages and drives a pin 202 mounted on a disc 204. This disc is rotatably mounted by bearing 206 on a shaft 208, to which the pressure regulating vane or rotary piston 210 is fixed. As disc 204 is turned by drum 106 it winds up the spiral spring 212 connected at 214 to the disc and at 217 to shaft 208. Thus, vane 210 is biased in the direction shown by the arrows by a spring force which constantly increases in direct proportion to the movement of drum 106 and the chart carried thereon.

Vane 210 is mounted in a substantially cylindrical housing or cylinder 216 which is divided into quadrants or chambers 218, 220, 222, 224 by the vane member 210 and fixed partitions 226 extending inwardly from the cylinder wall toward the shaft 208, on which the vane is mounted.

Chambers 220, 222 are interconnected by conduit 228 and chambers 218 and 224 are interconnected by a conduit 230. Chamber 218 is also connected by conduct 88 with the output of a compressor (not shown), while chamber 222 is connected by conduit 86 with the intake or suction side of the compressor.

Chambers 218, 224 correspond to the balancing chamber 72 in Fig. 1 and these chambers are connected by a tube 26 to the common passage of cell unit A'.

Chamber 222 is connected by conduit 232 with a negative pressure chamber 234 in a second cylinder 242. This second cylinder is similar to cylinder 216, with the exception that the rotary vane 244 is biased with a constant adjustable force, rather than a variable force, in the direction shown by the arrows, by a spiral spring 246 (Fig. 5). The tension of spring 246 may be adjusted and then fixed at an adjusted tension by freely rotatable disc 248 to which one end of the spring is secured at 250, the other end of the spring being fixed to the vane shaft at 256. Disc 248 may be locked in adjusted position with respect to cylinder 242 by inserting pin 252 in one of a series of holes 254 circumferentially spaced around the end wall of cylinder 242.

Cylinder 242, like cylinder 216, is also divided into chambers 234, 236, 238 and 240. Chamber 240 is maintained at the datum pressure by a conduit 76 communicating with the fluid flowing over the model. Chamber 240 is also connected by conduit 90 with the output of the compressor, the input or suction side of the compressor being connected with chamber 234 through conduits 232 and 86. Chambers 236 and 240 are interconnected at 258, and chambers 234 and 238 are interconnected at 260.

In the operation of the modification shown in Figs. 3, 4 and 5 the pressure in chambers 240 and 236 will always be at the datum pressure because of conduit 90, and the pressure in chambers 234 and 238 will be maintained at a value which is less than the datum pressure by an amount determined by the tension of spring 246. Chambers 222 and 220 will, therefore, also be at this negative back pressure and the pressure in chambers 218 and 224, or the balancing pressure, is constantly increased by the tightening spring 212 through a range having this negative pressure as a lower limit, always in exact proportion to the movement of drum 106 with respect to styluses 114. Thus, the length of the line scribed by each stylus on the chart carried by the drum will be exactly proportional to the balancing pressure necessary to snap the corresponding diaphragm to open position against the force exerted on the diaphragm by the pressure being measured.

Fig. 7 shows a modification of the mechanism for regulating the balancing pressure in proportion to the movement of the chart. The force on the pressure controlling piston 64 is varied by driving weight 300 along a lever arm 302 pivotally mounted on a fixed support at 304. The weight is driven along the lever by a lead screw 306 directly connected to a synchronous motor 308. The chart, which may be located at some remote point, is also driven by a synchronous motor operating at the same frequency as motor 308. The speed of the chart driving motor is proportional to the speed of motor 308 and the movement of weight 300 will therefore be proportional to the movement of the chart. Limit switches 310 and 312 may be provided to control the limits of travel of weight 300. These switches may be wired, in a manner obvious to those skilled in the art, to reverse motor 308 and start and stop the chart drive motor in order to make repeated records, automatically. The range of pressure measured may also be adjusted by shifting the location of the limit switches. By increasing or decreasing the value of weight 300 the ratio of chart movement to the rate of change of balancing pressure may be controlled.

Weight 300, motor 308 and the associated parts are all supported on pivot 304 and as the weight is moved along the lever 302 the force on piston 64, connected by a flexible link 316 to the lever, will be gradually varied, and will cause the balancing pressure in cylinder 72 to vary proportionally.

The static pressure piston 68 is balanced by an adjustable weight 318 on lever 320 pivoted on support 322 and flexibly connected at 324 to the static piston rod. The position of weight 318 along lever 320 determines the force exerted downwardly on piston 68 and thus determines the pressure difference that will be maintained by the compressor between the chamber 80' and the cylinder 74. As cylinder 74 communicates with the tunnel or datum pressure through conduit 76, it will always be maintained at the datum pressure and the pressure in chamber 80' will be less than datum pressure by an amount determined by the value and the position of weight 318.

Fig. 8 shows a modification of the pressure regulating cylinder. Cylinder 400 is internally tapered instead of being cylindrical like cylinder 72 in Fig. 1, so that the piston will be in stable equilibrium and will require no damping. This tapered cylinder is particularly adapted for use where a vertical movement of the piston causes only a negligible change in the force applied to the piston, as in the arrangement of Fig. 7. Fig. 8 also shows a means of eliminating vertical friction between the piston and the cylinder and between the piston rod and the cylinder. A small low speed motor 402 connected to and balanced with lever 382 constantly rotates the piston and the piston rod by the flexible chain 325, during a recording operation. Because the piston and the piston rod are always moving with respect to the cylinder 400, the frictional forces tending to resist translating movement between these parts are considerably lessened.

It is to be understood that the invention is not limited to the specific embodiments herein illustrated and described, but may be used in other ways without departure from its spirit or its scope as defined by the following claims.

I claim:

1. An instrument for measuring fluid pressure comprising, an electrically operable and movable recording element, a switch electrically connected with said recording element for energizing the latter during movement thereof, a compressor and a flow controlling device associated therewith for creating a variable fluid pressure in a balancing fluid pumped by said compressor through said flow controlling device, means connected with said recording element and operatively associated with said flow controlling device for varying said balancing fluid pressure in accordance with the movement of said recording element, and pressure responsive means operative when said balancing pressure exceeds the pressure being measured for actuating said switch.

2. In combination, a pressure controlled member, a chamber on each of the opposite sides of said member, means for connecting one of said chambers to a fluid the pressure of which is to be measured, a pressure regulator having a variable pressure chamber, means for connecting the other of said chambers to said regulator chamber, and mechanism responsive to the controlled movements of said member for recording the pressure of the fluid to be measured including a movable element and driving means for said element, said driving means also having an operative connection with said regulator for effecting variation in the pressure in said regulator chamber as said element is moved.

3. In combination, a pressure responsive member, a chamber on each of the opposite sides of said member, means for connecting one of said chambers to a fluid the pressure of which is to be measured, a pressure regulator having a variable pressure chamber, means for connecting the other of said chambers to said regulator chamber, mechanism for recording the pressure of the fluid to be measured including a movable recording element and means for driving said element, said driving means also having an operative connection with said regulator for effecting variation in the pressure in said regulator chamber as said element is moved, and means controlled by movement of said pressure responsive member for controlling the recording made by said movable element.

4. An apparatus adapted for the flight testing of aircraft comprising, a balancing pressure chamber adapted to be connected to a pressure actuated unit, a datum pressure chamber adapted to be connected to a source of reference pressure, a back pressure chamber having fluid connections to both said balancing chamber and said datum chamber, means tending to cause a flow of fluid through said connections to said back pressure chamber from each of said other chambers, separate flow controlling devices for regulating the flow of said fluid from each of said other chambers to said back pressure chamber, and means for varying the action of at least one of said flow controlling devices.

5. In combination, a pressure responsive member, a chamber on each of the opposite sides of said member, means for connecting one of said chambers to a fluid the pressure of which is to be measured, a pressure regulator having a balancing pressure chamber connected to the other of said chambers, a datum pressure chamber adapted to be connected to a source of reference pressure, a back pressure chamber having fluid connections to both said balancing chamber and said datum chamber, means tending to cause a flow of fluid through said connections to said back pressure chamber from each of said other chambers, separate flow controlling devices for regulating the flow of said fluid from each of said other chambers to said back pressure chamber, mechanism for recording the pressure of the fluid to be measured including electrical elements controlled by movements of said pressure responsive member, a driving element for said recording mechanism, and a cam driven by said driving element for varying the action of at least one of said flow controlling devices.

6. In combination, a pressure responsive member, a chamber on each of the opposite sides of said member, means for connecting one of said chambers to a fluid the pressure of which is to be measured, a pressure regulator having a balancing pressure chamber connected to the other of said chambers, a datum pressure chamber adapted to be connected to a source of reference pressure, a back pressure chamber having fluid connections to both said balancing chamber and said datum chamber, means tending to cause a flow of fluid through said connections to said back pressure chamber from each of said other chambers, separate flow controlling devices for regulating the flow of said fluid from each of said other chambers to said back pressure chamber, electrical means controlled by movements of said member including mechanism for recording the pressure of the fluid to be measured, a driving element for said recording mechanism, a spring connected with at least one of said flow controlling devices, and means for progressively stressing said spring by the movement of said element.

7. In combination, a pressure responsive member, a chamber on each of the opposite sides of said member, means for connecting one of said chambers to a fluid the pressure of which is to be measured, a pressure regulator having a variable pressure chamber and means for varying the pressure in said chamber including a movable element, means for connecting the other of said chambers to said regulator chamber, a recorder including relatively movable chart and stylus elements, common drive means for the movable elements of said regulator and recorder for varying the pressure in said regulator chamber in proportion to the movement of said recorder element, and means operative in response to movements of said pressure responsive member for controlling the record made by said recorder.

8. In combination, a pressure responsive member, a chamber on each of the opposite sides of said member, means for connecting one of said chambers to a fluid the pressure of which is to be measured, a pressure regulator having a variable pressure chamber and means for varying the pressure in said chamber including a movable element, means for connecting the other of said chambers to said regulator chamber, a recorder including relatively movable chart and stylus elements, drive means having an operative connection with the movable elements of both said regulator and said recorder for varying the pressure in said regulator chamber in proportion to the movement of said recorder element, an electric circuit including electro-responsive means controlling the record made by said movable chart and stylus elements, and contact means controlled by said pressure responsive member for governing the energization of said circuit.

9. In combination, a plurality of pressure responsive members, each having a chamber on each of its opposite sides, means for connecting one of the chambers of each member to a different fluid the pressure of which is to be measured, a pressure regulator having a variable pressure chamber and means for varying the pressure in said chamber including a movable element, means for connecting the other chambers of said pressure responsive members to said regulator chamber, a recorder including relatively movable chart and stylus elements, a stylus element being provided to record each of said fluid pressures to be measured, drive means having an operative connection with the movable elements of both said regulator and said recorder for varying the pressure in said regulator chamber in proportion to the movement of said recorder element, and means controlled by each of said pressure responsive members for controlling the record made on said chart by the stylus element provided for recording the pressure of the fluid to be measured which is associated therewith.

PAUL J. CAMPBELL.

REFERENCES CITED

The following references are of record in the file of this patent:

UNITED STATES PATENTS

| Number | Name | Date |
| --- | --- | --- |
| 982,123 | Brown | Jan. 17, 1911 |
| 1,075,620 | Arndt | Oct. 14, 1913 |
| 1,451,481 | Vincent | Apr. 10, 1923 |
| 1,692,513 | Newell | Nov. 20, 1928 |
| 1,938,492 | Moller | Dec. 5, 1933 |
| 1,992,343 | Ahnstrom | Feb. 26, 1935 |
| 2,015,967 | Ryder | Oct. 1, 1935 |
| 2,071,871 | Cleveland | Feb. 23, 1937 |
| 2,170,530 | Johnson | Aug. 22, 1939 |
| 2,237,070 | Cleveland | Apr. 1, 1941 |
| 2,243,398 | Sewell | May 27, 1941 |
| 2,257,577 | Rosenberger | Sept. 30, 1941 |
| 2,286,188 | MacLean | June 16, 1942 |
| 2,332,725 | Jordan | Oct. 26, 1943 |
| 2,382,547 | De Juhasz | Aug. 14, 1945 |